US010717503B2

(12) United States Patent
Sampson (10) Patent No.: US 10,717,503 B2
(45) Date of Patent: Jul. 21, 2020

(54) WATERCRAFT PROTECTION SYSTEMS AND METHODS

(71) Applicant: FLIR Systems, Inc., Wilsonville, OR (US)

(72) Inventor: Mark Sampson, Fareham (GB)

(73) Assignee: FLIR Systems, Inc., Wilsonville, OR (US)

( * ) Notice: Subject to any disclaimer, the term of this patent is extended or adjusted under 35 U.S.C. 154(b) by 376 days.

(21) Appl. No.: 15/438,528

(22) Filed: Feb. 21, 2017

(65) Prior Publication Data

US 2017/0158297 A1 Jun. 8, 2017

Related U.S. Application Data

(63) Continuation of application No. PCT/US2015/047575, filed on Aug. 28, 2015.

(60) Provisional application No. 62/044,897, filed on Sep. 2, 2014.

(51) Int. Cl.
| | | |
|---|---|---|
| *B63B 1/22* | (2006.01) | |
| *B63B 39/06* | (2006.01) | |
| *B63B 43/18* | (2006.01) | |
| *B63H 20/10* | (2006.01) | |
| *B63H 21/21* | (2006.01) | |
| *G01S 15/93* | (2020.01) | |

(52) U.S. Cl.
CPC ............... *B63B 43/18* (2013.01); *B63B 1/22* (2013.01); *B63B 39/061* (2013.01); *B63H 20/10* (2013.01); *B63H 21/21* (2013.01); *G01S 15/93* (2013.01); *B63B 2201/18* (2013.01); *B63B 2732/00* (2013.01); *B63B 2733/00* (2013.01); *B63H 2021/216* (2013.01)

(58) Field of Classification Search
CPC ......... B63B 1/22; B63B 39/061; B63B 43/18; B63B 2201/18; B63B 2732/00; B63B 2733/00; B63H 20/10; B63H 21/21; B63H 2021/216; G01S 15/93
See application file for complete search history.

(56) References Cited

U.S. PATENT DOCUMENTS

| | | |
|---|---|---|
| 3,886,487 A | 5/1975 | Walsh et al. |
| 5,238,432 A | 8/1993 | Renner |
| (Continued) | | |

FOREIGN PATENT DOCUMENTS

| | | |
|---|---|---|
| DE | 2426268 | 1/1975 |
| DE | 3600327 | 7/1987 |
| WO | WO 2004/050477 | 6/2004 |

*Primary Examiner* — Jerrah Edwards
(74) *Attorney, Agent, or Firm* — Haynes and Boone, LLP (57) ABSTRACT

Provided is a system for protecting submerged components of a watercraft from collision with a submerged object or a floor of a body of water. The system includes a depth sensor configured to measure a water depth beneath the watercraft, an actuated mechanism configured to adjust a depth of at least one of the submerged components, and a controller in communication with the depth sensor and the actuated mechanism. The controller is operable to receive the measured water depth and control the actuated mechanism to adjust the depth of the at least one submerged component as a function of the measured water depth to prevent the at least one submerged component from colliding with the submerged object or floor of the body of water.

20 Claims, 6 Drawing Sheets

(56) References Cited

U.S. PATENT DOCUMENTS

| | | | | |
|---|---|---|---|---|
| 5,842,895 A | * | 12/1998 | DeVito, Jr. | B63H 20/007 |
| | | | | 440/6 |
| 6,273,771 B1 | * | 8/2001 | Buckley | B63H 21/213 |
| | | | | 114/144 RE |
| 6,734,808 B1 | | 5/2004 | Michaelson et al. | |
| 2007/0242134 A1 | * | 10/2007 | Zernov | H04N 5/2252 |
| | | | | 348/81 |
| 2009/0163090 A1 | * | 6/2009 | Heromin | B63H 20/10 |
| | | | | 440/65 |

\* cited by examiner

WATERCRAFT PROTECTION SYSTEMS AND METHODS

CROSS REFERENCE TO RELATED APPLICATIONS

This application is a continuation of International Patent Application No. PCT/US2015/047575 filed Aug. 28, 2015 and entitled "WATERCRAFT PROTECTION SYSTEMS AND METHODS", which is incorporated herein by reference in its entirety.

International Patent Application No. PCT/US2015/047575 filed Aug. 28, 2015 claims priority to and the benefit of U.S. Provisional Patent Application No. 62/044,897 filed Sep. 2, 2014 and entitled "WATERCRAFT PROTECTION SYSTEMS AND METHODS," which is incorporated herein by reference in its entirety.

BACKGROUND

Technical Field

This disclosure generally relates to the automatic control of watercraft propulsion components, and in particular, to automatic systems and methods for protecting watercraft motor legs and propellers using depth sensor information.

Related Art

Many powered watercraft today utilize one of three well known types of motor/propulsion or drive arrangements: "inboard," "outboard," and "inboard/outboard" ("I/O") or so-called "sterndrive" arrangements. Each of these has associated advantages and disadvantages and differs from the others primarily in the location of the motors or engines that drive them and the arrangements by which the motors are coupled to a screw or propeller used to propel the watercraft over the surface of a body of water. However, all three inherently have the common feature that the propeller and at least a portion of the drive shaft and/or motor "leg," to which the propeller is drivingly coupled are disposed below the water surface and are therefore subject to damage if they collide with the sea bed or a submerged object as the watercraft travels over the water.

All drive types may include a "shear pin" or "slip clutch" arrangement that couples the propeller to the associated drive shaft or leg to provide some measure of protection for the propeller, and which function by breaking or slipping when a blade of the spinning propeller impacts a solid object with sufficient force, thereby enabling the drive shaft to spin independently of the propeller. Outboard drives and I/O or sterndrives also typically include an arrangement that allows the lower end of the motor leg and propeller to "kick up," i.e., pivot upwardly and rearwardly relative to the watercraft upon their impact with a submerged object or the floor of the body of water. Since inboard drives lack motor legs, they also lack this latter protection scheme. However, regardless of the drive type, any use of these conventional protective measures typically results in at least a measure of inconvenience for the watercraft's owner and are often inadequate to prevent expensive damage to the propeller, the drive leg, the watercraft's keel, and/or other submerged components of the watercraft.

What is needed then is an automated system that functions to protect watercraft propellers and the legs of outboards and sterndrives from damaging contact with the floor of the body of water in which the watercraft floats, and that enables shallow running without the need for constant manual trim adjustments. Further, it would be desirable to provide a system that, when beaching the watercraft, automatically lifts and/or tilts the outboard or sterndrive leg at a rate corresponding to the sea bed incline, and further, automatically retracts any "trim tabs" used to raise/lower the stern of the watercraft, and/or any other adjustable watercraft components, in order to protect them from damage.

SUMMARY

In accordance with the present disclosure, embodiments of automated systems and methods are described for protecting watercraft propellers and, in the case of outboard or I/O drives, their associated legs, from collision with the sea bed or a submerged object, which enable shallow running of the watercraft without the need for constant manual trim adjustments, and which, during the beaching of a watercraft, automatically lifts the legs of outboard or sterndrives and/or any trim tabs present at a rate corresponding to the incline of the floor of the body of water at the beach so as to protect them from being damaged.

In one embodiment, a system for protecting submerged components of a watercraft from collision with a submerged object or a floor of a body of water may include a depth sensor configured to measure a water depth beneath the watercraft, an actuated mechanism configured to adjust a depth of at least one of the submerged components, and a controller in communication with the depth sensor and the actuated mechanism. The controller may be operable to receive the measured water depth and control the actuated mechanism to adjust the depth of the at least one submerged component as a function of the measured water depth to prevent the at least one submerged component from colliding with the submerged object or floor of the body of water.

In another embodiment, the system can activate a visible and/or audible alarm and/or deactivate the watercraft's motor if, for example, the distance between the submerged drive components and the floor of the body of water or the submerged object is less than a pre-set value, a trim tab mechanism of the watercraft is incapable of lifting the stern of the watercraft sufficiently relative to the surface of the water, and/or cooling water intake holes for the watercraft's motor become incapable of taking in an amount of water sufficient to cool the motor. In some embodiments, during a beaching operation, the system can automatically adjust a drive leg and propeller of an outboard drive or a sterndrive to a fully raised and/or tilted position after shutting off the motor of the watercraft and/or can retract any trim tab mechanisms on the watercraft to a fully retracted position after shutting off the motor.

In a further embodiment, a method for protecting submerged components of a watercraft from collision with a submerged object or a floor of a body of water may include measuring a water depth beneath the watercraft, wherein the water depth corresponds to the submerged object and/or the floor of the body of water, receiving one or more pre-set and/or updated parameters from a memory device, and controlling an actuated mechanism to adjust a depth of at least one of the submerged components as a function of the measured water depth and the one or more pre-set and/or updated parameters to prevent the at least one submerged component from colliding with the submerged object or floor of the body of water.

The scope of this invention is defined by the claims appended hereafter, which are incorporated into this section by reference. A more complete understanding of the features and advantages of the novel automatic systems and methods for protecting watercraft drive legs and propellers will be afforded to those skilled in the art by a consideration of the detailed description of some example embodiments thereof presented below, particularly if such consideration is made in conjunction with the appended drawings, briefly described below, wherein like reference numerals are used to identify like elements illustrated in one or more of the figures thereof.

DETAILED DESCRIPTION

In accordance with the present disclosure, example embodiments of systems and methods are described for protecting watercraft propellers and, in the case of outboard or I/O drives, their associated legs, from contact with the sea bed, which enable a boat or other watercraft to run in shallow water without the need for constant manual trim adjustments, and which, during the beaching of the watercraft, automatically lifts and/or tilts the legs of outboard or sterndrives and/or any trim tabs that may be present on the watercraft at a rate corresponding to the shoaling of the floor of the corresponding body of water so as to protect them from being damaged by contact therewith.

Figure 1A:
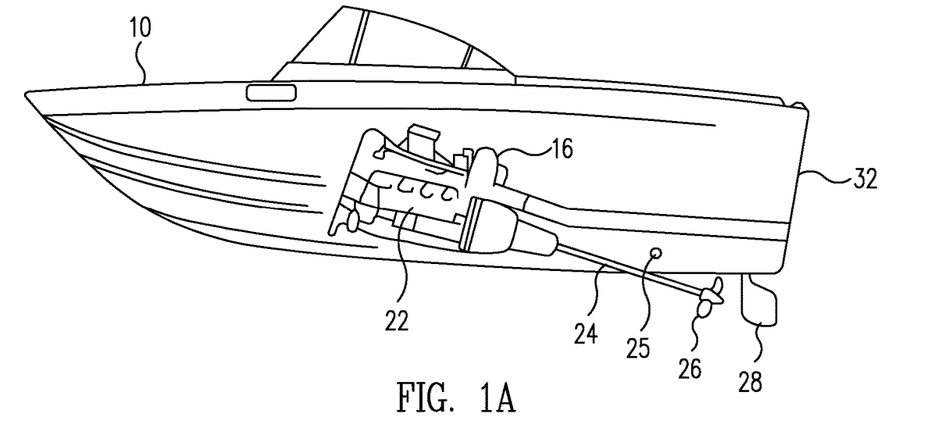
FIGS. 1A-1C are left side elevation views of boats incorporating an inboard drive, an outboard drive, and an inboard/outboard ("I/O") or sterndrive, respectively.
Figure 1B:
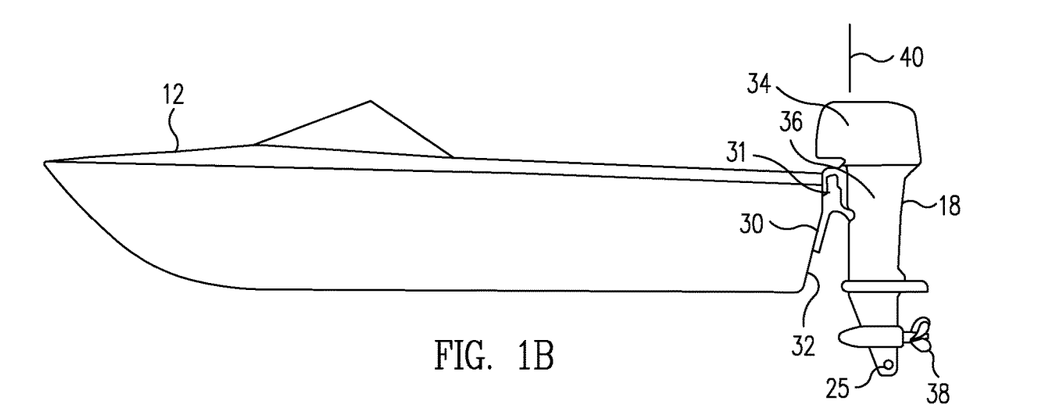
Figure 1C:
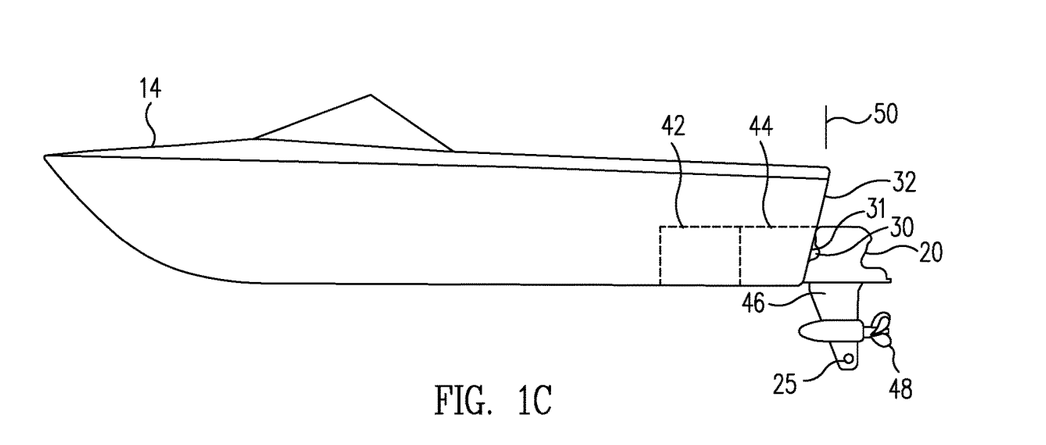

FIGS. 1A-1C are left side elevation views of an "inboard" boat 10, an "outboard" boat 12, and an "inboard/outboard" ("I/O") or "sterndrive" boat 14, respectively, so-named because of the drive systems they respectively incorporate, viz., an inboard drive 16, an outboard drive 18, and an inboard/outboard (I/O) or sterndrive 20. As illustrated in FIG. 1A, the inboard drive boat 10 is characterized by a motor or engine 22 that is disposed inboard of the associated boat 10, a drive shaft 24 having an inboard end coupled to a drive output of the motor 22 and extending rearwardly through the hull of the boat 10, and a propeller 26 coupled to an outboard end of the drive shaft 24. Because the propulsive thrust of the propeller 16 of an inboard watercraft 10, such as that illustrated in FIG. 1A, is fixed directly reward and not "steerable," inboard watercraft are also typically provided with one or more rudders 28 that are used to steer the watercraft 10. At least one and typically both of the propeller 16 and rudder 28 are typically disposed forward of the lower edge of the transom 32 of the boat 10.

As illustrated in FIG. 1B, the drive of an "outboard" drive boat 12 typically comprises a single integrated drive 18, disposed entirely outboard of the boat 12, that couples to an upper edge of the transom 32 of the boat 12, and/or to a moveable lift and/or tilt (L/T) mechanism 30 disposed therein or on a rear surface thereof, and includes a motor or engine 34 disposed atop a downwardly extending drive leg 36 having a right-angled drive shaft arrangement disposed at the lower end thereof, and a propeller 38 coupled to a rearwardly extending extension of the drive shaft. The integrated outboard drive 18 is typically configured to pivot about a vertical axis 40 to direct the thrust of the propeller 38 in a selected direction, and hence, to control the heading of the boat 12. In some embodiments, the L/T mechanism 30 can comprise, for example, a first plate fixed to and/or near a back surface of the transom of the boat 12 and a second plate coupled to the first plate for rotational and/or translational movement relative thereto. Further, in some embodiments, remotely controllable power actuators 31 in the L/T mechanism 30 can be used to lift the unit 18 vertically and/or to tilt the drive 18 upwardly and rearwardly relative to the boat 12 for trimming, beaching or trailering purposes. In some embodiments, all three movements of the drive 18, i.e., pivot, lift and tilt, can be effected remotely, i.e., from a steering station or a cabin of the boat 12, through the appropriate utilization of hydraulic, pneumatic and/or electrical actuators or solenoid devices and one or more electrical and/or mechanical user interfaces.

The I/O or sterndrive watercraft 14 represents a hybrid of the first and second types discussed above, and includes a motor or engine 42 disposed inboard of the watercraft 14, a drive shaft 44 having an inboard end coupled to the output of the motor 42 and extending rearwardly through the transom of the watercraft, a first right-angle drive arrangement coupled to the output end of the drive shaft 44, a downwardly extending drive leg 46 containing a drive shaft having an upper end coupled to the output end of the first right-angled drive, a second right-angled drive shaft arrangement disposed at the lower end thereof and coupled to an output end of the drive shaft, and a propeller 48 coupled to a rearwardly extending extension of the drive shaft. With the exception of the location of the motor or engine 42 and the means by which it is coupled to the propeller 48, the I/O drive 20 is substantially similar to that of the outboard drive 18 described above. As in the inboard drive 18 above, the leg 46 of the drive 20 is typically configured to pivot about a vertical axis 50 to direct the thrust of the propeller 48 in a selected direction to control the heading of the watercraft 14. Additionally, in some embodiments, at least the leg 46 of the drive 20 can be lifted vertically for trim purposes and/or tilted upwardly and rearwardly relative to the boat 14 for trimming, beaching or trailering purposes by an L/T mechanism 30 similar to that described above in connection with the outboard drive 18. And, like the outboard drive 18 above, in some embodiments, all three movements of the leg 46, i.e., pivot, lift and tilt, can be effected remotely, using hydraulic, pneumatic and/or electrical actuators 31 disposed in the L/T mechanism 30.

In all three types of drives, the motors 22, 34 and 42 are typically cooled by water drawn from the body of water upon which the associated watercraft 10, 12 or 14 is afloat. Such water may be drawn from one or more cooling water intakes 25 disposed either on the drive legs 36 or 46 and/or in a bottom or side of the watercraft's hull, as shown in FIG. 1A.

Figure 2:
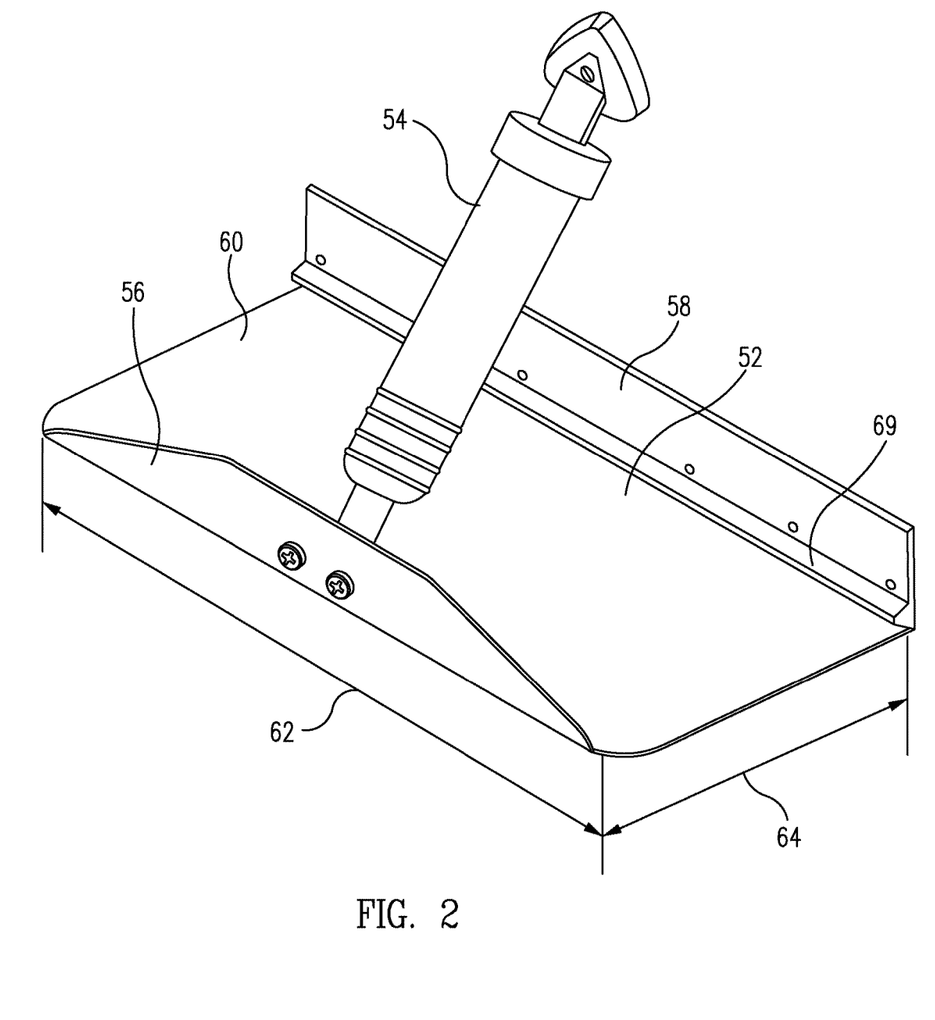
FIG. 2 is an upper, rear end and right side perspective view of an example boat trim tab and actuator therefor.
Figures 3A, 3B:
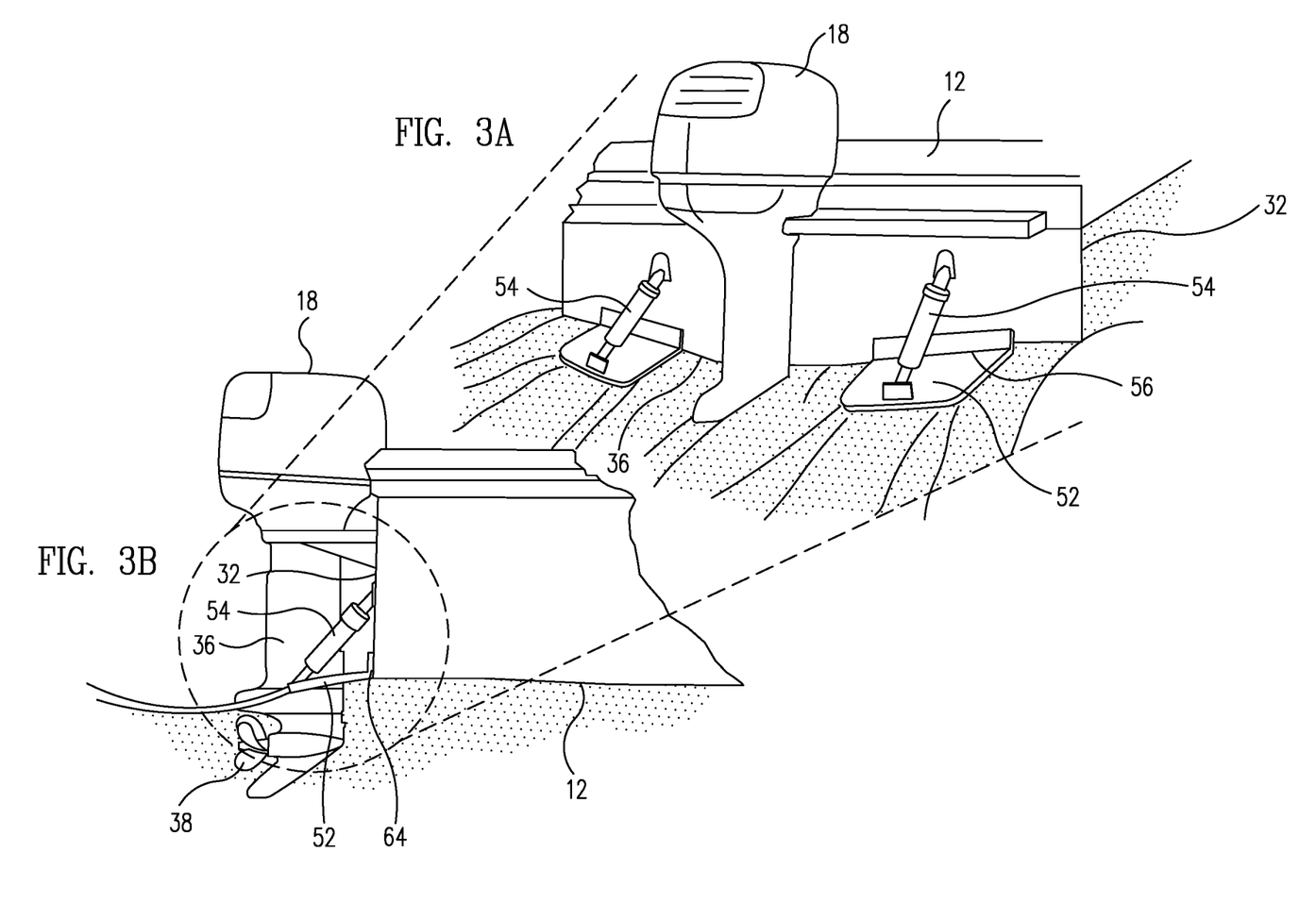
FIGS. 3A and 3B are partial rear end perspective and right side elevation views, respectively, of a boat powered by an outboard motor drive and incorporating a pair of powered trim tabs disposed at the lower edges of the boat's transom and on opposite sides of the outboard.

FIG. 2 is an upper, rear end and right side perspective view of an example trim tab 52 and actuator 54 therefor, and FIGS. 3A and 3B are partial rear end perspective and right side elevation views, respectively, of a watercraft 12 powered by an outboard motor 18 and incorporating a pair of the powered trim tabs 52 disposed symmetrically about a centerline of the watercraft 12 near or at lower edges of the boat's transom 32 and on opposite sides of the outboard drive 18.

As can be seen in FIG. 2, the example trim tab 52 comprises a generally flat plate having an upstanding rear flange 56 to which a first end of the actuator 54 is attached, an upstanding front flange 58, which can be used to attach the trim tab 52 to the transom 32 of an associated boat, and a "trim plane" 60, the area of which is obtained by multiplying its width or "span" 62 by its length or "chord" 64. The intersection of the front flange 58 and the trim plane 60 define a hinge 69, e.g., a so-called "solid hinge" 69, by which the trim plane 60 is hinged to a lower edge of a boat transom for upward and downward pivoting movement relative thereto, as illustrated in FIGS. 3A and 3B. As further illustrated in these figures, the second end of the actuator 54 can also be coupled to the transom 32 of the watercraft 12.

As those of some skill will understand, as the boat/watercraft 12 is propelled forwardly through a body of water by the propeller 38, if the trim tab 52 is disposed at an acute angle relative to the transom 32, the trim tab 52 will have no effect on the pitch of the watercraft 12. However, as illustrated in FIGS. 3A and 3B, if the trim tab 52 is lowered or deployed to make an obtuse angle with the transom 32, i.e., so as to make contact with the water, the rearward movement of the water relative to the trim tab 52 will cause the water to impinge on the trim plane 60 of the trim tab 52 and thereby lift the stern of the watercraft 12, and hence, the leg 36 and propeller 38 of the outboard drive 18, in an upward direction as a result of force imparted by the water on trim tab 52. In general, as the speed of the watercraft 12 is increased, the angular displacement of the trim plane 60 relative to the transom 32 may be decreased to achieve a given lift of the watercraft's stern, and, vice-versa.

Figure 4A:
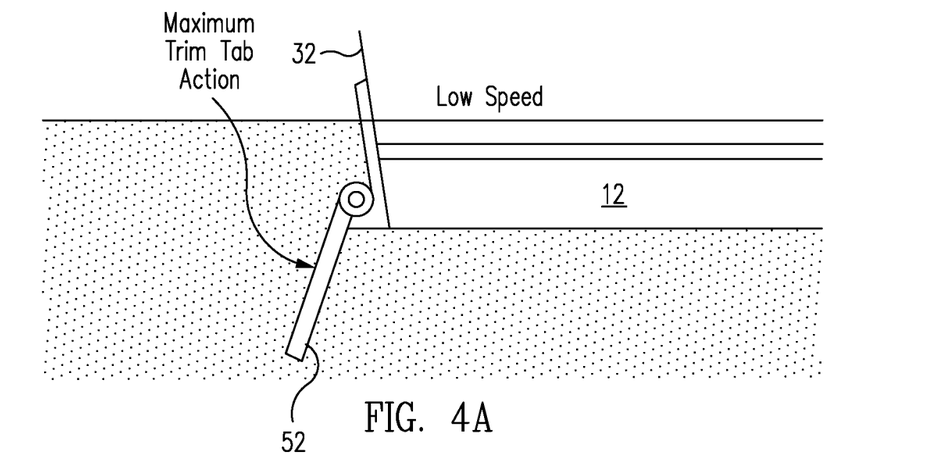
FIGS. 4A-4C are partial side elevation views of a boat using a trim tab to control the pitch attitude of the boat at low speeds, normal cruising speeds, and high speeds, respectively.
Figure 4B:
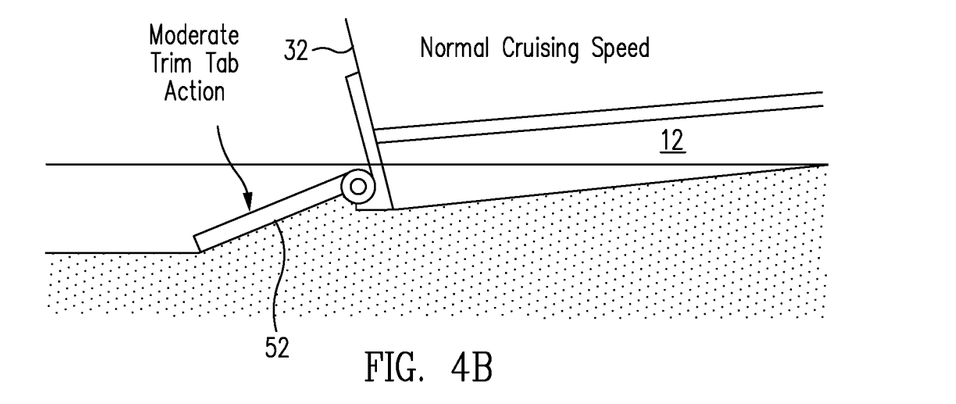
Figure 4C:
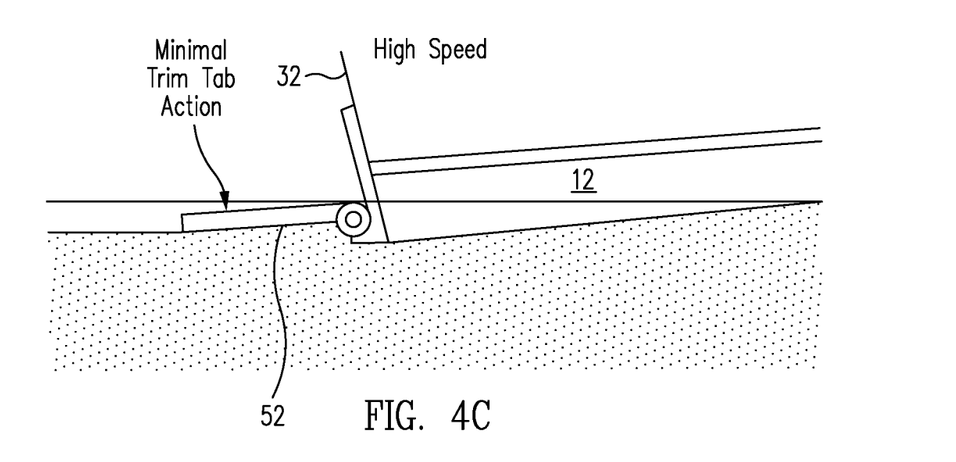

This relationship between the speed of the watercraft 12 through the body of water and the trim tab 52 angular displacement relative to the transom 32 is illustrated in FIGS. 4A-4C, respectively illustrating a trim tab 52 being used to adjust the pitch of watercraft 12 at low speeds, normal cruising speeds, and high speeds, respectively, and in which the necessary deployment angle of the trim tab 52 is an inverse function of the speed of the boat. Trim tabs thus provide a mechanism for lifting the legs, propellers, keels, and/or other submerged components of outboard and sterndrive watercraft 12 and 14, as described above, and even the propellers, rudders, and submerged components of inboard boats 10 described above, relative to the underlying floor of the body of water. In some embodiments, and in the case of inboard boats 10, trim tabs 52 may be the only mechanism for doing so.

As discussed above, there is a need for systems and methods that automatically protect watercraft propellers and legs from damaging contact with the floor of the body of water or other underwater obstacles when underway, and which enable running in shallow or shoaling waters without the need for manual adjustments of the trim of the watercraft. Additionally, it would be desirable when beaching the watercraft if these same systems could function to automatically raise or lift the watercraft's propellers, legs, trim tabs, and/or other adjustable submerged components relative to the underlying sea bed at a rate corresponding to the typically declining slope of the shore bed.

Figure 5A:
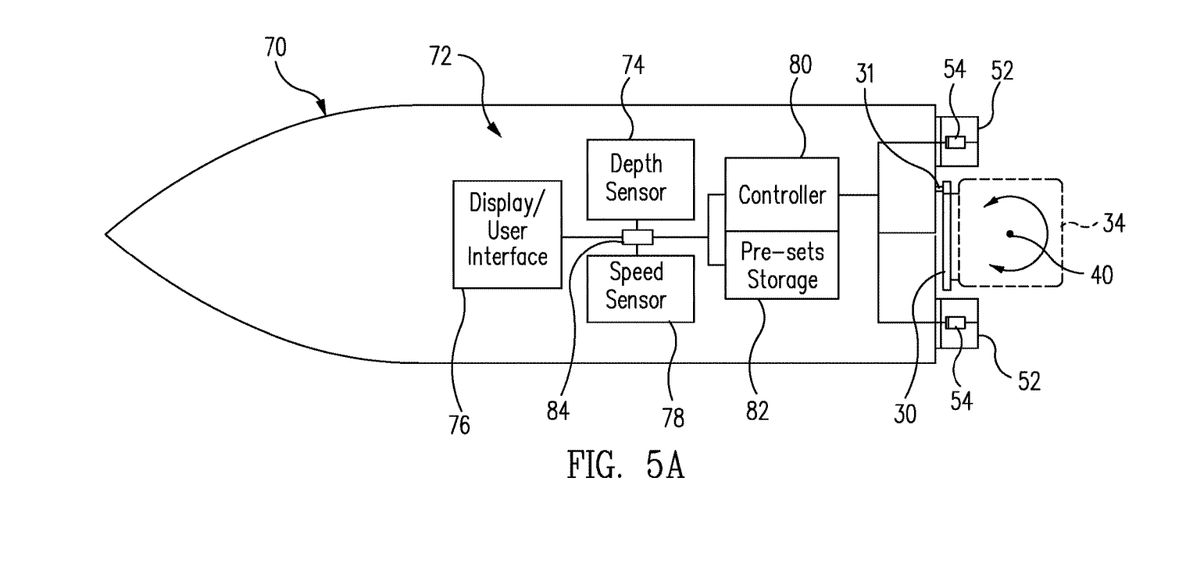
FIGS. 5A and 5B are top plan and left side elevation views, respectively, of a boat incorporating an example embodiment of a system for automatically protecting the propeller and drive leg of the boat in accordance with the present invention.
Figure 5B:
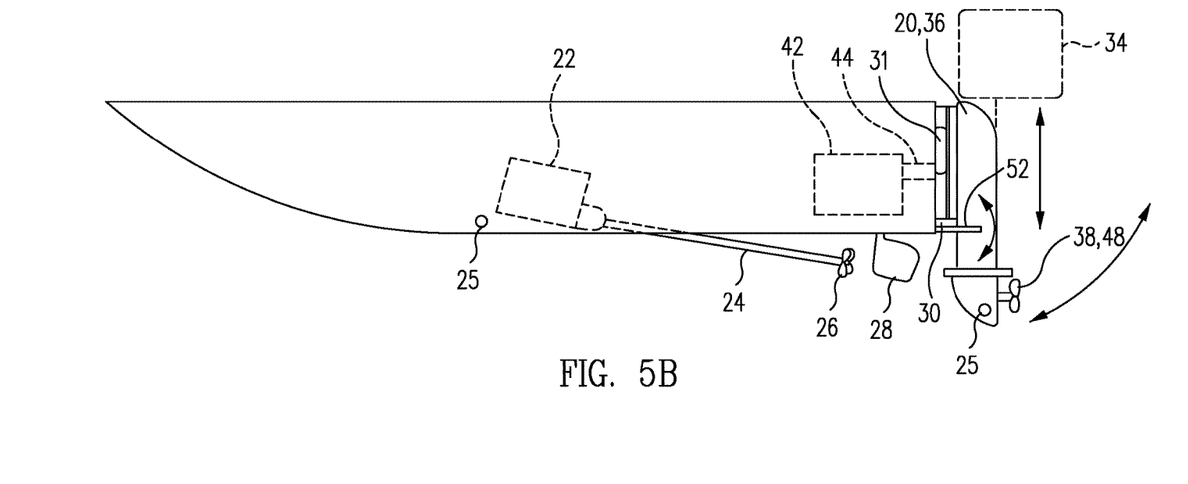

FIGS. 5A and 5B are top plan and left side elevation views, respectively, of a watercraft 70 incorporating an example embodiment of a system 72 for automatically protecting the propeller and/or the drive leg of the boat in accordance with the present invention using depth information provided by a depth sensor 74 and speed information provided by a speed sensor 78. As illustrated in the top plan view of FIG. 5A, the example system 72 is seen to comprise, in addition to the depth sensor 74 and speed sensor 78, a multifunction display ("MFD") and user interface 76, a controller 80, and a memory/storage device 82 for storing user "pre-set" values and/or updated parameters discussed below and relating to the water depth values at which, in accordance with the present invention, the system 72 begins to tilt and/or lift the propellers 26, 38 or 48, the rudder 28, and drive legs 20 or 36 of the watercraft 70 to protect them from contact with the floor of the body of water or other submerged objects. In the particular example embodiment of FIGS. 5A and 5B, the storage device 82 is shown commonly housed with the controller 80, but other locations within the system 72 are possible, e.g., within the MFD/interface 76. In one advantageous embodiment, the components of the system 72 can be linked to each other and to the actuators 31 and 54 which are used to effect propeller and/or motor or drive leg tilt and/or lift in a data communication "network" by means of a actuator control signal interface 84, which may be implemented with wired and/or wireless interconnects, for example, and which may be adapted to form a power distribution system in addition to forming a data communication network. In various embodiments, various elements of system 72 (e.g., display user interface 76, and/or portions of controller 80 and/or memory 82) may be implemented in a portable electronic device, such as a tablet computer, a smart phone, and/or other portable device that can be used as a user interface, for example, and couple wirelessly to the rest of system 72.

As seen in FIG. 5B, for illustration purposes, the example watercraft 70 is seen to include all three of the drive arrangements discussed above in connection FIGS. 1A-1C: an inboard drive, an outboard drive and an I/O or sterndrive. However, as those of some skill will appreciate, although multiple drive arrangements, e.g., side-by-side drive arrangements, are possible and frequently used in current watercraft, they are often of the same type of drive, i.e., all inboard, all outboard, or all I/O drives. In the same vein, the actuators used by the system 72 to tilt and/or lift the propellers 26, 38 or 48, the rudders 28, and/or the drive legs 20 or 36 of the watercraft 70 relative to the floor of the body of water comprise the actuators 31 of the moveable mechanism 30 used to lift/tilt the legs 20 or 36 and the propellers 38 or 48 of the outboard or I/O drives, and the actuators 54 used to actuate the trim tabs 52, respectively. In the case of outboard or I/O drive boats 70, one or both sets of the leg lift/tilt and trim tab and actuators 31 and 54 could be present, whereas, in the case of an inboard drive watercraft 70, typically only the trim tab actuators 54 would be available for raising the stern of the watercraft 70, and hence, the propeller(s) 26 and rudder(s) 28 thereof, for the reasons discussed above in connection with FIGS. 2-4C.

In various embodiments, the multifunction display/user interface 76 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, multifunction display/user interface 76 may be adapted to provide user input (e.g., as a type of signal and/or sensor information) to other devices of system 72, such as controller 80. Multifunction display/user interface 76 may also be implemented with one or more logic devices that may be adapted to execute instructions, such as software instructions, implementing any of the various processes and/or methods described herein.

Controller 80 (and/or memory storage device 82) may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of watercraft 70, for example. Such software instructions may implement methods for processing sensor signals, determining sensor information, providing user feedback (e.g., through multifunction display/user interface 76), querying devices for operational parameters, selecting operational parameters for devices, or performing any of the various operations described herein (e.g., operations performed by logic devices of various devices of system 72). In addition, a machine readable medium (e.g., device 82) may be provided for storing non-transitory instructions for loading into and execution by controller 80. In these and other embodiments, controller 80 may be implemented with other components where appropriate, such as volatile memory, non-volatile memory, one or more interfaces, and/or various analog and/or digital components for interfacing with devices of system 72. For example, controller 80 may be adapted to store sensor signals, sensor information, parameters for coordinate frame transformations, calibration parameters, sets of calibration points, and/or other operational parameters, over time, for example, and provide such stored data to a user using user interface multifunction display/user interface 76.

In various embodiments, depth sensor 74 may be implemented as a sonar system including a sonar transducer mounted to a hull of watercraft 70 that is configured to measure a water depth beneath watercraft 70 by emitting acoustic pulses, receiving corresponding acoustic returns, and determining the water depth from characteristics of the acoustic returns. For example, in various embodiments, depth sensor 74 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, depth sensor 74 may be implemented according to other depth sensor and/or sonar system arrangements that can be used to detect water depth, objects within a water column, and/or a floor of a body of water. Speed sensor 78 may be implemented as an electronic pitot tube, metered gear or wheel, water speed sensor, and/or other device capable of measuring or determining a linear speed of watercraft 70 relative to a surrounding body of water and providing such measurements as sensor signals that may be communicated to various devices of system 72.

In particular embodiments, the multifunction display/user interface 76 of the actuator control system could comprise, for example, one similar to the RAYMARINE "A SERIES" MFD/user interfaces, and the depth sensor 74 could comprise, for example, one similar to the RAYMARINE "P66" transom-mounting depth sensor, or the RAYMARINE "B45" through-hull depth sensor. The speed sensor 78 could comprise, for example, one similar to the transom-mounting RAYMARINE "ST69" speed sensor, or the RAYMARINE "P120-ST800" through-hull speed and temperature sensor. The controller 800 could comprise the RAYMARINE "ACU 300" actuator control unit, and the memory storage device 82 could comprise, for example, a look-up table, RAM, DRAM, ROM, PROM, or EEPROM module(s), or other well-known types of data storage devices. The actuator control signal interface 84 linking the system's components to each other and the actuators of the lift and/or tilt devices could comprise, for example, one like the RAYMARINE "SEATALK BUS" and the RAYMARINE "ECI-100" Universal Engine and Control Interface, and/or any of a variety of interfaces utilizing one or more National Marine Electronics Association (NMEA) protocols, which may be implemented with a number of wired and/or wireless communication links.

Figure 6:
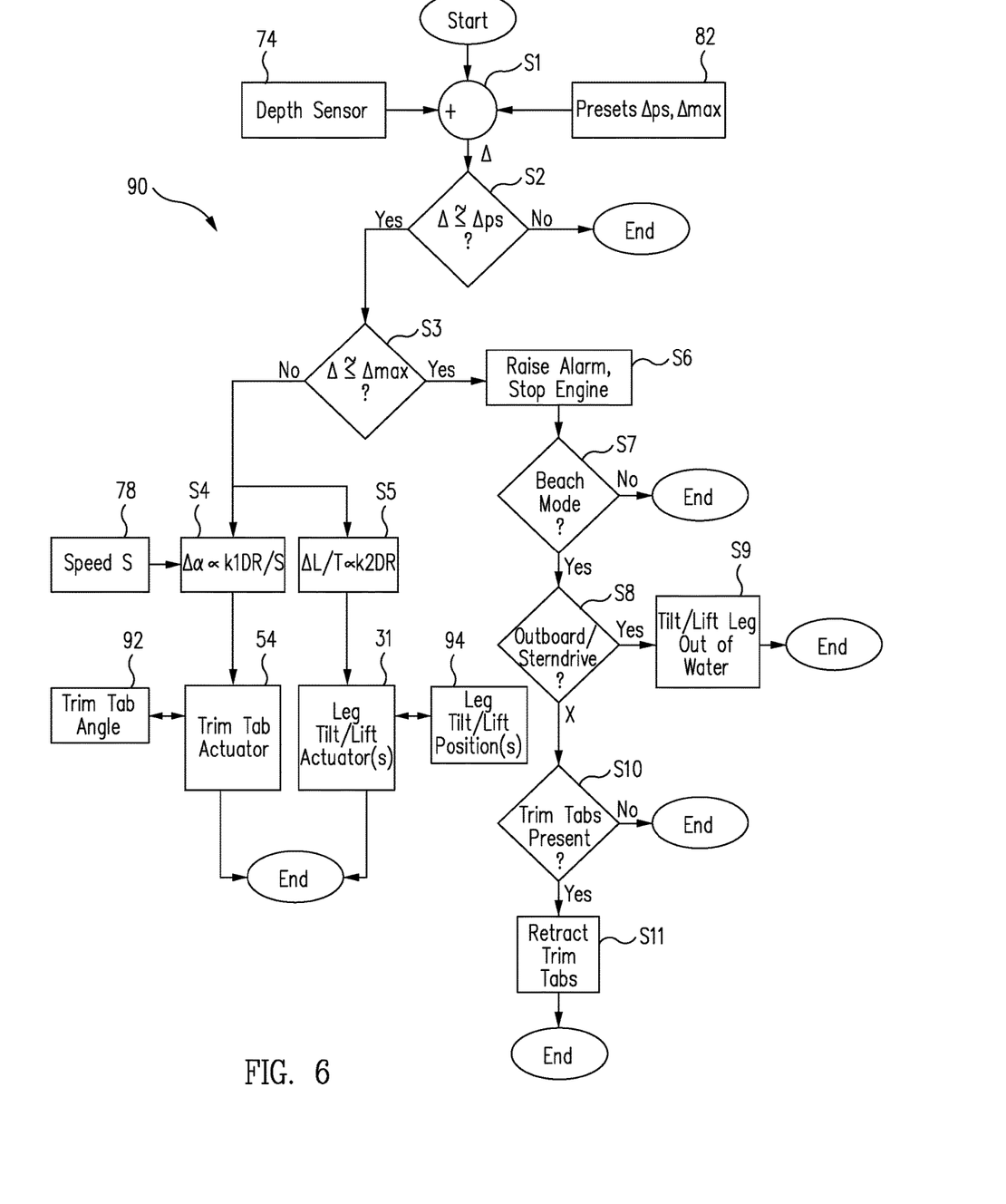
FIG. 6 is a logic and decisional flow diagram illustrating an example embodiment of a method for operating the automatic protection system of the present invention.

Operation of an embodiment of automatic protection system 72 is illustrated in FIG. 6. Before use, a user may enter, e.g., into the MFD/user interface 76, a set of "presets," i.e., control parameters corresponding to, in the case of an inboard drive watercraft 70, the operational depths of the propeller 26 and rudder 28, and in the case of an outboard or I/O drive watercraft 70, the operational depths of propeller 38 or 48 and leg 20 or 36 as a function of a lift and/or tilt supplied by L/T mechanism 30 and actuated by L/T actuator 31, referred to herein as $\Delta PS$. In some embodiments, $\Delta PS$ may be the distance between the lowest point of a component and the hull or keel of watercraft 70, for example, or may be the distance between the lowest point of the component and the position of the depth sensor 74 or the typical level of the surface of the surrounding water when watercraft 70 in floating and/or under power. As a pre-set parameter, $\Delta PS$ may be set to a maximum depth (e.g., where L/T mechanism 30 is fully extended into the water), for example, or may be calculated based on a sensed actuation status of, for example, L/T actuator 31 (e.g., corresponding to an absolute or relative position and/or orientation of L/T mechanism 30) and a table, formula, or other set of pre-set parameters linking a particular actuation status to a particular value for $\Delta PS$ for a particular component. In some embodiments, a small dimensional "safety buffer" can be added to one or more $\Delta PS$ values associated with a particular component, for example, and such safety buffer may be function of the speed of watercraft 70 (e.g., so as to increase with increasing speed, for example).

The user may also enter one or more pre-set parameters $\Delta MIN$ corresponding to a "minimum operational depth," i.e., a depth of a component corresponding to a minimum depth for the component below which the component becomes unable to perform its function (e.g., to propel or steer watercraft 70, provide a sufficient trim tab based lifting force on the stern of watercraft 70, and/or other functions) under the circumstances. In the case of the moveable L/T mechanism 30, $\Delta MIN$ may correspond to a lift and/or tilt condition at which the propeller 38 or 48 or leg 20 or 36 of the outboard or I/O drive are raised to a depth where there is substantial cavitation or insufficient control surface bite in the surrounding water to propel or steer watercraft 70. In other embodiments, $\Delta MIN$ may correspond to a lift condition at which cooling water intakes 25 of motor 22, 34, or 42 (e.g., typically located on leg 20 or 36 adjacent to propeller 38 or 48, or on a bottom or side of the hull of watercraft 70)

are approximately at or above the surface of the surrounding water and cannot reliably be used to route sufficient cooling water to a motor (e.g., a minimum intake depth).

In the case of the trim tabs 52, in one embodiment, ΔMIN may correspond to a minim angular deployment α at which trim tabs 52 lose contact with the surface of the water, for example, or where trim tabs 52 are unable, based on the relationship between speed of watercraft 70 and the angular deployment α, to provide a lifting force sufficient to adjust a pitch of watercraft 70 and/or to raise the stern of watercraft 70 enough for a particular submerged component (e.g., including the trim tabs 52 themselves) to avoid a submerged object or floor of a body of water at that measured depth. As such, ΔMIN may include a table, formula, graph, or other type of method to provide a particular value for ΔMIN for a variety of speeds of watercraft 70, for example.

It should be understood that some pre-set values discussed above may be specific to the particular watercraft 70, its particular drive arrangement (e.g., inboard, outboard, and/or I/O), its cooling intake arrangement, and the various actuated mechanisms (e.g., trim tab mechanisms, lift and/or tilt mechanisms) used therein, and may often be published by the manufacturer of the watercraft 70 and/or it's particular drive arrangement. These and other parameters may be initialized to pre-set values and then be updated as watercraft 70 travels along the body of water over time.

In some embodiments, automatic protection system 72, when selectably enabled by the user, can operate in two user-selectable modes:

MODE 1: A "contour/obstacle" mode—In this mode, the protection system 72 may be configured to automatically and autonomously control the trim tabs 52 and/or the lift/tilt mechanism 30 to increase or decrease the depth of the protected components, based on the contour or measured depth of the floor of the body of water as sensed by the depth sensor 74 when the measured depth of the water is less than or equal to one or more of the pre-set and/or updated values ΔPS. The system 72 can warn the user (e.g., by activating a visible and/or audible alarm) when the measured depth of the water is less than a particular ΔPS and/or when the system 72 raises the stern of the watercraft 70 and/or the drive leg 20 or 36. Additionally, if the measured depth decreases to the point at which the trim tabs 52 are no longer effective to lift the stern of the watercraft 70 and/or effective motor cooling stops, i.e., one or more ΔMIN values, then the system 72 can activate another alarm.

MODE 2: A "beaching mode"—In this mode the automatic protection system 72 enables a user to effectively use a "contour following" technique to approach a shore, and if/when a ΔMIN condition is reached during that approach, the system 72 can switch off the motor 22, 34 or 44 and, in the case of a watercraft 70 equipped with trim tabs 52, can lift them to their fully retracted positions to prevent damage to trim tabs 52, and in the case of an outboard or I/O drive watercraft 70, lift and/or tilt the leg 20 or 36 into a "beaching lock" position, i.e., at its maximum raised and locked position (e.g., typically where the operational depth of the component is above the level of the hull of watercraft 70). This mode thus enables a user to effectively "point and shoot" the watercraft 70 towards a beach while focusing on where to beach rather than also worrying about manually trimming the watercraft 70.

FIG. 6 is a logic and decisional flow diagram illustrating an example embodiment of a method 90 for operating the automatic protection system 72 of the present invention. The example method 90 begins at S1 by combining a measured water depth Δ provided by the depth sensor 74, corresponding to the instantaneous depth of the water below the watercraft 70, with previously stored parameters (e.g., presets, ΔPS, ΔMIN, measured speed, prior measured water depth, actuation statuses, and/or other previously stored parameters) in the storage device 82, which may include a measured speed for watercraft 70 provided by speed sensor 78, for example, in addition to one or more actuation statuses corresponding to trim tab actuator 54 and/or L/T actuator 31, as discussed above. In some embodiments, method 90 includes additional steps prior to S1 where controller 80 is configured to poll speed sensor 78 and/or various actuators of system 72 prior to receiving a measured water depth from depth sensor 78, for example, and/or to calculate updated values for ΔPS, and providing the various values for further processing at S2 as described herein.

At S2, the controller 80 determines whether the measured water depth Δ is approximately equal to or less than any one of the preset and/or updated values ΔPS corresponding to each submerged component of watercraft 70 (e.g., propellers 26, 28, 48, rudder 28, legs 20, 36, trim tabs 52, and/or other submerged components of watercraft 70). In some embodiments, controller 80 may be configured to determine which component's ΔPS is largest (e.g., which submerged component has the greatest depth) and perform the comparison of S2 (e.g., and/or the adjustments of S4 and/or S5) based on that component. If "no," then the method 90 may terminate and then loop back to S1.

If the determination at S2 is "yes," then the method 90 moves to S3, at which a determination is made as to whether the measured depth Δ is approximately equal to or less than the any one of the preset and/or updated values ΔMIN (e.g., a minimum depth for a typically submerged component below which the component becomes unable to perform its function). As such, at S3, controller 80 may be configured to calculate or otherwise determine an updated value ΔMIN corresponding to a measured speed of watercraft 70 prior to performing the comparison(s). Further, in some embodiments, controller 80 may be configured to determine which component's ΔMIN is largest (e.g., which submerged component has the deepest ΔMIN) and perform the comparison of S3 based on that component. If at S3 the determination is "no," then method 90 then proceeds, depending on the lift/raise mechanisms 30 and/or trim tabs 52 present on the watercraft 70, to one, the other, or both of S4 and S5, at which the amount of lift and/or tilt to be implemented using the actuators 31 and/or 54 of the lift and/or tilt mechanisms may be computed. In some embodiments, methods 90 may include steps to activate one or more visual or audible alarms if either S4 or S5 are utilized to adjust trim tab actuator 54 and/or L/T actuator 31.

As discussed above, in the case of trim tabs 52, the amount of correction Δα to be applied by the actuators 54 of the trim tabs 52 may be directly proportional to the desired increase in the depth of the threatened component (e.g., the desired rise ΔR) and inversely proportional to the speed S of the watercraft 70 through the water, as provided by the speed sensor 78, i.e., Δα may be proportional to k1*ΔR/S, as indicated at S4, where k1 is a gain parameter configured to convert the ratio of the desired rise ΔR to measured speed of watercraft 70 into a desired change in the deployment angle Δα. As discussed above, a corresponding control signal, when applied to the trim tab actuator(s) 54, will lift the stern of the watercraft 70 so as to decrease the operational depth of the propellers 24, 38 or 48, legs 20, 30 and/or rudder(s) 28 to its corresponding ΔPS to prevent the submerged component from colliding with a submerged object or floor of a body of water.

In the case of watercraft 70 equipped with moveable lift/tilt mechanisms 30, the amount of correction ΔL/T to be applied to the actuators 31 of the L/T mechanisms may be directly proportional to the desired rise ΔR, i.e., ΔL/T may be proportional to k2*ΔR, where k2 is a gain parameter configured to convert the desired rise ΔR into a desired change in the position/orientation of lift/tilt mechanisms 30 (e.g., k2 may be equal to 1 if only lift is available). As also discussed above, a corresponding control signal, when applied to the actuators 31 of the moveable L/T mechanism 30, will decrease the operational depth of the propellers 38 or 48 and/or legs 20, 30 of the watercraft 70 (e.g., through lift and/or tilt motion) to its corresponding ΔPS to prevent the submerged component from colliding with a submerged object or floor of a body of water.

In the case of a watercraft 70 equipped with trim tabs 52 and moveable L/T mechanisms 30, it may be desirable to adjust the respective correction signals Δα and ΔL/T to emphasize one type of correction over another, or to minimize both corrections, based on a measured depth and/or a measured speed. Further, in some embodiments, since the lifting effect of the trim tabs 52 is highly dependent of the speed S of the watercraft 70, it might be desirable to "weight" the adjusted correction signals applied to the respective actuators 31 and 54 in accordance with the speed S of the watercraft 70. For example, at high speeds, adjustments to trim tabs 2 may be emphasized over adjustments to L/T mechanisms 30, and vice versa at low speeds. Moreover, adjustments may be coordinated to avoid various overcorrection conditions, such as oscillations in the adjustments over time. After applying any of the various actuator adjustments described herein with respect to S4 and S5, method 90 may terminate and then loop back to S1.

Returning to step S3, if the determination is "yes" (e.g., trim tabs 52 are no longer functional to lift the stern of the boat further and/or the motor cooling water intake hole(s) are located such that they are no longer effective to cool the associated motor(s) effectively), then, at S6, the controller 80 of the system 72 can be configured to stop the motor(s) 22, 34, 44 of the watercraft 70 and to activate alarm(s) as discussed above in connection with the contour/obstacle mode and/or the beaching mode.

Additionally, if at S7, the system 72 is operating in the "beaching" mode discussed above, and at S8, is equipped with an outboard or I/O type drive, then at S9, the system controller 80 can be configured to lift and/or tilt the propeller 38 or 48 and leg 20 or 36 of the watercraft 70 out of the water and into a "beaching lock" position (e.g., fully lifted and/or tilted away from the body of water). In some embodiments, motor(s) 22 and/or 34 may include a transmission (e.g., forward, reverse, neutral) that system 72 is configured to place in neutral as part of the process of lifting/tilting the propeller 38 or 48 and leg 20 or 36 of the watercraft 70 out of the water. Further, as discussed above, if at S10, the watercraft 70 is equipped with trim tabs 52, then at S9, the controller 80 can raise them to their fully retracted positions so as to prevent their being damaged upon landing.

As those of some skill will recognize, the protection system 72 may include a servomechanism, or closed loop control system, in which the controlled variable is the height of the protected components above the sea bed or other underwater objects. As indicated in FIG. 6, in some embodiments, the trim tab actuators 54 and the moveable L/T mechanism actuators 31 can incorporate actuation status sensors 92 and 94 that output a signal corresponding their absolute or relative positions and/or orientations, and in addition to the signals of the depth and speed sensors 74 and 78, these signals can also be fed back to the controller 80 for enhanced accuracy and stability of the system 72.

In light of the foregoing detailed description, it will be clear to those of some skill that many modifications, substitutions and variations can be made in and to the materials, apparatus, configurations and methods of use of the automatic watercraft drive leg and propeller protection systems of the present disclosure, and in light of this, that the scope of the present disclosure should not be limited to that of the particular embodiments illustrated and described herein, as they are merely by way of some example embodiments thereof, but rather, should be fully commensurate with that of the claims appended hereafter and their functional equivalents.

What is claimed is:

1. A system for protecting submerged components of a watercraft from collision with a submerged object or a floor of a body of water, the system comprising:
   a depth sensor configured to measure a water depth beneath the watercraft;
   an actuated mechanism configured to adjust a depth of at least one of the submerged components; and
   a controller in communication with the depth sensor and the actuated mechanism, wherein the controller is operable to:
   receive the measured water depth,
   control the actuated mechanism to adjust the depth of the at least one submerged component as a function of the measured water depth to prevent the at least one submerged component from colliding with the submerged object or floor of the body of water, and
   activate a visual and/or audible alarm and/or deactivate a motor for the watercraft when:
   the water depth is approximately equal to or less than the depth of the at least one submerged component;
   the actuated mechanism is approximately at an actuator limit;
   the water depth is approximately equal to or less than a minimum intake depth for cooling water intakes of the motor; and/or
   an intake depth for the cooling water intakes is approximately at or above a surface of the body of water.

2. The system of claim 1, wherein:
   the actuated mechanism comprises a lift/tilt (L/T) mechanism;
   the L/T mechanism comprises a first plate fixed to a back surface of the watercraft, a second plate coupled to the first plate for rotational and/or translational movement relative thereto, and an L/T actuator configured to selectably rotate and/or translate the second plate relative to the first plate; and
   the controller is operable to control the LT actuator of the L/T mechanism to lift and/or tilt the at least one submerged component to prevent the at least one submerged component from colliding with the submerged object or floor of the body of water.

3. The system of claim 1, wherein the actuated mechanism comprises a trim tab (TT) mechanism configured to lift a stern of the watercraft relative to a surface of the body of water in response to forward motion of the watercraft, the system further comprising:
   a speed sensor configured to measure a speed of the watercraft relative to the body of water, wherein the controller is operable to control the TT mechanism to adjust the depth of the at least one submerged component as a function of the water depth and the measured speed of the watercraft.

4. The system of claim 3, wherein the TT mechanism comprises:
a generally flat plate pivotally hinged near a lower edge of a transom of the watercraft; and
a TT actuator configured to selectably pivot the plate between acute and obtuse angular positions relative to the transom.

5. The system of claim 3, wherein the depth sensor and/or the speed sensor are mounted through a hull of the watercraft and/or on a transom of the watercraft.

6. The system of claim 1, wherein:
the adjustment mechanism comprises at least one trim tab (TT) mechanism and/or a lift/tilt (L/T) mechanism; and
the at least one TT mechanism and/or LT mechanism includes one or more actuation status sensors configured to measure the absolute and/or relative positions and/or orientations of the at least one TT mechanism and/or LT mechanism.

7. The system of claim 1, further comprising:
a multifunction display and user interface;
a memory device for storing pre-set and/or updated system parameters; and
a wired and/or wireless actuator control signal interface.

8. The system of claim 7, wherein the pre-set and/or updated parameters comprise:
one or more actuator limits for the actuated mechanism;
an actuation status for the actuated mechanism;
the measured water depth;
a speed of the watercraft relative to the body of water;
the depth of the at least one submerged component; and/or
a minimum intake depth for cooling water intakes of a motor for the watercraft;
wherein the at least one submerged component comprises a propeller, a rudder, a drive leg, a trim tab, and/or a keel of the watercraft.

9. The system of claim 1, wherein the controller is further operable to:
control the actuated mechanism to retract, raise, and/or tilt the submerged component away from the submerged object or floor of the body of water and/or at least partially above a surface of the body of water.

10. The system of claim 1, wherein the at least one submerged component comprises an inboard motor, an outboard motor, or an inboard/outboard (I/O) motor for the watercraft.

11. The system of claim 1, wherein the controller activates the visual and/or audible alarm and/or deactivates the motor for the watercraft when the actuated mechanism adjusts the depth of the at least one submerged component to prevent the at least one submerged component from colliding with the submerged object or floor of the body of water.

12. A method for protecting submerged components of a watercraft from collision with a submerged object or a floor of a body of water, the method comprising:
measuring a water depth beneath the watercraft, wherein the water depth corresponds to the submerged object and/or the floor of the body of water;
receiving one or more pre-set and/or updated parameters from a memory device;
controlling, by a controller, an actuated mechanism to adjust a depth of at least one of the submerged components as a function of the measured water depth and the one or more pre-set and/or updated parameters to prevent the at least one submerged component from colliding with the submerged object or floor of the body of water; and
activating a visual and/or audible alarm and/or deactivating a motor for the watercraft when:
the water depth is approximately equal to or less than the depth of the at least one submerged component;
the actuated mechanism is approximately at an actuator limit;
the water depth is approximately equal to or less than a minimum intake depth for cooling water intakes of the motor; and/or
an intake depth for the cooling water intakes is approximately at or above a surface of the body of water.

13. The method of claim 12, wherein:
the actuated mechanism comprises a lift/tilt (L/T) mechanism; and
the controlling the actuated mechanism comprises controlling an L/T actuator of the L/T mechanism to lift and/or tilt the at least one submerged component to prevent the at least one submerged component from colliding with the submerged object or floor of the body of water.

14. The method of claim 12, further comprising measuring a speed of the watercraft relative to the body of water, wherein:
the actuated mechanism comprises a trim tab (TT) mechanism configured to lift a stern of the watercraft relative to a surface of the body of water in response to forward motion of the watercraft; and
the controlling the actuated mechanism comprises controlling the TT mechanism to adjust the depth of the at least one submerged component as a function of the water depth and the measured speed of the watercraft.

15. The method of claim 14, wherein the TT mechanism comprises:
a generally flat plate pivotally hinged near a lower edge of a transom of the watercraft; and
a TT actuator configured to selectably pivot the plate between acute and obtuse angular positions relative to the transom.

16. The method of claim 12, wherein:
the adjustment mechanism comprises at least one trim tab (TT) mechanism and/or a lift/tilt (L/T) mechanism; and
the at least one TT mechanism and/or LT mechanism includes one or more actuation status sensors configured to measure the absolute and/or relative positions and/or orientations of the at least one TT mechanism and/or LT mechanism.

17. The method of claim 12, further comprising storing the one or more pre-set and/or updated parameters in the memory device, wherein the one or more pre-set and/or updated parameters comprise:
one or more actuator limits for the actuated mechanism;
an actuation status for the actuated mechanism;
the measured water depth;
a speed of the watercraft relative to the body of water;
the depth of the at least one submerged component; and/or
a minimum intake depth for cooling water intakes of a motor for the watercraft;
wherein the at least one submerged component comprises a propeller, a rudder, a drive leg, a trim tab, and/or a keel of the watercraft.

18. The method of claim 12, further comprising:
controlling the actuated mechanism to retract, raise, and/or tilt the submerged component away from the submerged object or floor of the body of water and/or at least partially above a surface of the body of water.

19. The method of claim 12, wherein the at least one submerged component comprises an inboard motor, an outboard motor, or an inboard/outboard (I/O) motor for the watercraft.

20. The method of claim 12, wherein the controller activates the visual and/or audible alarm and/or deactivates the motor for the watercraft when the actuated mechanism adjusts the depth of the at least one submerged component to prevent the at least one submerged component from colliding with the submerged object or floor of the body of water.

\* \* \* \* \*